United States Patent [19]

Kohaut et al.

[11] Patent Number: 4,599,269
[45] Date of Patent: Jul. 8, 1986

[54] FOAMABLE PLASTICS GRANULES AND PACKAGING MATERIAL PREPARED THEREFROM

[75] Inventors: Günter Kohaut, Königstein; Werner Weber, Nauheim, both of Fed. Rep. of Germany; Herman Groenendijk, Oosterhout, Netherlands; Adrianus C. Poppelaars; Wilhelmus H. J. Janssen, both of Breda, Netherlands

[73] Assignee: Hoechst Aktiengesellschaft, Fed. Rep. of Germany

[21] Appl. No.: 679,907

[22] Filed: Dec. 10, 1984

[30] Foreign Application Priority Data

Dec. 10, 1983 [DE] Fed. Rep. of Germany ....... 3344685
Sep. 27, 1984 [DE] Fed. Rep. of Germany ....... 3435440

[51] Int. Cl.$^4$ .......................... B32B 5/16; B29B 9/00; B65D 81/12
[52] U.S. Cl. .................... 428/397; 206/523; 206/584; 206/814; 264/51; 264/53; 264/142; 428/398; 428/402
[58] Field of Search ........................ 206/523, 584, 814; 428/402, 397, 398, 399; 264/51, 53, 142, 143

[56] References Cited

U.S. PATENT DOCUMENTS

| | | | |
|---|---|---|---|
| 3,400,037 | 9/1968 | Sare et al. | 428/534 |
| 3,887,672 | 6/1975 | Stahnecker et al. | 428/402 |
| 3,961,000 | 6/1976 | Ropiequet | 264/45.5 |
| 4,269,895 | 5/1981 | Borchert et al. | 428/402 |
| 4,500,586 | 2/1985 | Bussey, Jr. | 428/402 |

FOREIGN PATENT DOCUMENTS

| | | |
|---|---|---|
| 0041431 | 11/1983 | European Pat. Off. . |
| 2848338 | 5/1980 | Fed. Rep. of Germany . |
| 1262346 | 2/1972 | United Kingdom . |

*Primary Examiner*—William J. Van Balen
*Attorney, Agent, or Firm*—Connolly and Hutz

[57] ABSTRACT

The invention relates to plastics granules composed of foamable particles derived from a star-shaped fundamental solid having at least three sides, these particles being a three-dimensionally domed structure by virtue of the sides having paraboloidal curvature, and the surfaces of paraboloidal curvature being staggered in relation to one another. These granule particles preferably have three sides and at least one gap.

The invention also relates to a packaging material obtained by foaming the said plastics granules. This packaging material exhibits an improved flow while having at the same time an improved packaging action (good packaging properties and a high void volume).

27 Claims, 10 Drawing Figures

FOAMABLE PLASTICS GRANULES AND PACKAGING MATERIAL PREPARED THEREFROM

Packaging or filling materials composed of loose foamed plastics particles are known and are employed in large quantities. Decisive factors for them are, in particular, their non-dusting character, their capacity to resist moisture and mold formation, their abrasion resistance and their inert behavior towards the goods to be packaged and their low weight. Plastics particles of this type are usually made available in the form of compact, non-foamed granules containing a blowing agent, and they are only foamed into their final shape by known processes when they reach the packaging plant.

The action of the foamed plastics particles as a packaging material depends on the fact that, after the goods to be packaged have been embedded in them, they jam or become interlocked with one another and, in addition, enclose a large void volume. The void volume here is the volume enclosed, but not filled up, by the particles when they are poured in to form a heap of loose material. A type of "spring-loaded casing" is thus formed around the goods. The mutual interlocking, while at the same time forming a large void volume, is particularly important to prevent the "migration" of the packaged article through the particles of packaging agent as a result of vibration during transport, and to achieve an optimum, permanent "spring action".

The requirement that the particles forming the packaging material must be free-flowing is in opposition to the capacity at the same time also to interlock with other particles and thus to form a large void volume. The first requirement arises because the light foamed plastics particles are usually introduced from storage silos into the packaging containers under conditions of free fall. Fault-free flow of the particles is a requirement for this purpose, since otherwise "bridge-formation" takes place in the storage bunker as a result of the particles jamming, and the uniform outflow and thus the metered addition of the particles is interfered with or prevented. This leads to perceptible problems particularly in the case of fully automatic packaging plants.

Attempts have been made to fulfil these conflicting requirements for the packaging material by imparting a specific shape to the foamed plastics particles, i.e. to achieve free-flowing behavior during removal from the storage container while at the same time retaining a large void volume and good jamming or interlocking of the particles in the packaging container. The following may be mentioned as examples of the shape of the particles: S-shape, Y-shape, star-shape, corrugated oblong or round leaflets, rings, split rings, 8-shaped hollow articles, spiral articles, particles in the shape of potato chips, hemispheres, saddle-shaped particles, dumb-bell-shaped particles and flakes.

Although the particle shapes mentioned above frequently have satisfactory interlocking properties together with acceptable flow properties, the void volume, which is essential for packaging behavior, remains below the desired level.

The object of the invention was, therefore, to provide foamed plastics granules which, after foaming, produce a packaging material having good flow, good interlocking properties and, at the same time, a high void volume in the heap.

In order to achieve this object there are proposed in the invention plastics granules composed of foamable particles in star shape, wherein the granules are mainly composed of particles derived from a star-shaped fundamental solid having three, five or more sides, in the case of three sides the surfaces of two sides being curved relative to one another in a paraboloidal manner, while the surface of the third side has a paraboloidal curvature which is opposed thereto, and, in the case of five or more sides, four sides are each curved relative to one another in a paraboloidal manner, while the surface or surfaces of the remaining side or sides have a paraboloidal curvature which is opposed to the curvature of the four sides, whereby, in each of these cases, a three-dimensionally domed structure is formed and has paraboloidal surfaces of curvature which are staggered in relation to one another.

The object according to the invention is also achieved by means of plastics granules composed of foamable particles in star shape, wherein the plastics granules are mainly composed of particles derived from a star-shaped fundamental solid having four sides, all four sides being curved relative to one another in a paraboloidal manner, as a result of which a three-dimensionally domed structure is formed and has paraboloidal surfaces of curvature which are staggered in relation to one another.

The invention also relates to the use of these foamable plastics granules for the production of appropriately foamed packaging materials and to the foamed packaging materials thus obtained themselves.

The granule particles according to the invention preferably have a three-sided or six-sided shape and, particularly preferentially, a three-sided shape.

The particles of the foamable plastics granules according to the invention are predominantly domed, preferably to the extent of more than 90% and particularly to the extent of more than 95%. In this respect, for example in the case of the three-sided granule particles which are particularly preferred in accordance with the invention, the sides (2), (3) and (4) in terms of FIG. 1 are already three-dimensionally curved relative to one another in such a way as also appears in the packaging material solids obtained by foaming, even if the doming is in most cases not yet so pronounced.

The wall thickness of the granule particles according to the invention is generally within the range from 0.8 to 3.5 mm, preferably 1.0 to 2.5 mm.

The dimensions (A), (B) and (C) in the case of three-sided granule particles (cf. FIGS. 1 and 2) are in most cases 6 to 12 mm, 4 to 8 mm and 3 to 6 mm. The corresponding preferred values are 8 to 10 mm (A), 5 to 7 mm (B) and 4 to 5 mm (C). The angle $\alpha$ between the sides 2 and 4 (FIG. 1) expediently ranges between 90° and 180°, preferably 120° and 170°, while the angle $\beta$ between sides 3 and 2/4 (FIG. 2) is in most cases between 60° and 160°, preferably between 80° and 120°.

In general, for three-sided granule particles, the ratio of (D) to (A) is 1:2.4 to 1:15, preferably 1:4 to 1:10, the ratio of (D) to (B) is 1:1.6 to 1:10, preferably 1:2.5 to 1:7, the ratio of (D) to (C) is 1:1.2 to 1:10, preferably 1:2.0 to 1:5, the ratio of (C) to (A) is 1:0.75 to 1:4, preferably 1:1.6 to 1:2.5, the ratio of (C) to (B) is 1:0.5 to 1:2.7, preferably 1:1.0 to 1:1.8, the ratio of (B) to (A) is 1:0.75 to 1:3, preferably 1:0.87 to 1:2 and the ratio (C):(B):(A) is 1:0.5 to 2.7:0.75 to 3, preferably 1:1 to 1.8:0.87 to 2.

The dimensions, angles and dimensional ratios are entirely similar in the case of four-sided, five-sided, six-sided and poly-sided particles.

The side length, for example in the six-sided particles, is as a rule 4 to 8 mm, preferably 5 to 7 mm, while the angle between the four sides which have a parabolic curve relative to one another is in most cases between 90° and 180°, preferably between 120° and 170°, and the angle between the two remaining sides is in most cases between 60° and 160°, preferably between 80° and 120°.

In accordance with a further preferred embodiment according to the invention, the foamable granule particles have at least one gap (a hole), it being possible for this gap to be either in one of the sides or in the center of the granule particles. Preferred particles are in this case those which have gaps in all the sides; particles which are also preferred are those in which the gap is located only in the center, which applies particularly to six-sided particles. If the gaps are only relatively small and if their size ranges within the lower section of the ranges mentioned below, it can be advantageous in some cases also to arrange a gap in the center of the granule particles in addition to the gaps in the sides.

The gaps preferably have predominantly circular to oval or lenticular shape; in principle, however, other shapes are also possible, such as polygons, for example triangles, quadrilaterals, hexagons etc. The size of these gaps is in general such that their area is about 25% to about 75%, preferably 30% to 60%, relative to the area of the particular side or to the total area in the case of only a gap in the center. The diameter or the maximum clear width of these gaps is in most cases 0.2 to 2.0 mm, preferably 0.3 to 1.5 mm.

Plastics which are suitable for the particles according to the invention are the thermoplastics customarily used for packaging materials, such as, for example, styrene polymers, polyolefines, such as polyethylene, VC polymers and the like. It is preferable to employ polystyrene.

The preparation of these foamable, compact plastics granules containing blowing agent is effected in a known manner by melting the plastic in an extruder, metering in a suitable blowing agent into the plastics melt under pressure, pressing out the melt containing blowing agent through an appropriate star-shaped (clover-leaflike) mold opening and subsequently granulating the product. This mold opening is equipped with mold cores (mandrels), the shape and number of which correspond to the desired gaps. In order to prevent foaming during extrusion, the ribbons emerging from the extruder are cooled rapidly, preferably by means of a water bath. The length of the most advantageous distance in the water bath and the take-off rate of the ribbons can be determined easily by those skilled in the art by means of a few simple routine tests. The cooled ribbons are then cut perpendicularly to the direction of take-off into particles of the thickness indicated above. In this process, the ribbon temperature should preferably be chosen such that the proportion of dust and splinters during cutting is as low as possible.

The expandable particles thus formed can be foamed by heating above their softening point, for example by means of steam, to give the packaging material solids according to the invention. Usually, this foaming is not carried out until the material is with the consumer. A chemical blowing agent, which releases gases, for example water vapor, carbon dioxide or nitrogen, on heating can also be mixed into the plastic before extrusion, instead of a physical blowing agent.

The packaging material thus obtained is composed predominantly, preferably to the extent of over 90% and especially to the extent of over 95%, of particles having the shape described above, i.e. the shape of a spherical bent polygon, whereby, in the case of three sides, the surfaces of two sides are curved relative to one another in a paraboloidal manner, while the surface of the third side has a paraboloidal curvature which is opposed thereto, and, in the case of five or more sides, four sides are each curved relative to one another in a paraboloidal manner, while the surface or surfaces of the remaining side or sides have a paraboloidal curvature which is opposed to the curvature of the four sides, whereby, in each of these cases, a three-dimensionally domed structure is formed and has paraboloidal surfaces of curvature which are staggered in relation to one another.

In the case of four sides, as in the case of the granule particles, all four sides are similarly curved relative to one another in a paraboloidal manner, as a result of which a three-dimensionally domed structure is formed and has paraboloidal surfaces of curvature which are similarly staggered in relation to one another.

The wall thickness of the particles of the packaging material according to the invention is generally 2 to 8 mm, preferably 3 to 6 mm, the wall thickness being at a maximum in the center of the particle and declining towards the edge zones.

In the case of three-sided particles (cf. FIGS. 3 to 5 the dimensions (A'), (B') and (C') are in most cases 16 to 40 mm, 16 to 40 mm and 8 to 20 mm. The corresponding preferred values are 20 to 38 mm (A'), 17 to 30 mm (B') and 12 to 18 mm (C'). The angle $\alpha'$ between the sides 2 and 4 (FIG. 3) expediently ranges between 30° and 130°, preferably 60° and 100°, while the angle $\beta'$ between the sides 3' and 2'/4' (FIG. 4) is in most cases between 0° and 150°, preferably between 30° and 120° and especially 60° to 100°.

In general, for three-sided particles, the ratio of (D') to (A') is 1:2.7 to 1:20, preferably 1:4 to 1:12.7, the ratio of (D') to (B') is 1:2.7 to 1:20, preferably 1:3.4 to 1:10, the ratio of (D') to (C') is 1:1.3 to 1:10, preferably 1:2.4 to 1:6, the ratio of (C') to (A') is 1:0.8 to 1:5, preferably 1:1.1 to 1:3.16, the ratio of (C') to (B') is 1:0.8 to 1:5, preferably 1:0.94 to 1:2.5, the ratio of (B') to (A') is 1:0.4 to 1:2.5, preferably 1:0.67 to 1:2.2, and the ratio (C'):(B'):(A') is 1:0.8 to 5:0.4 to 2.5, preferably 1:0.94 to 2.5:0.67 to 2.2.

The dimensions, angles and dimensional ratios in the case of four-sided, five-sided, six-sided and poly-sided particles are entirely similar. The side length, for example in the six-sided particles, is as a rule 16 to 40 mm, preferably 17 to 30 mm, while the angle between the four sides which are curved relative to one another in a paraboloidal manner is in most cases between 30° and 130°, preferably 60° to 100°, and the angle between the two remaining sides is in most cases between 0° and 150°, preferably between 30° and 120° and especially between 60° and 100°.

In accordance with those in the granule particles, the gaps in the packaging material particles are preferably round, oval and/or lenticular and are preferably located on all the sides, or the center alone preferably has one gap. The area of this/these gap/gaps is, as a rule, about 25% to about 75%, preferably 30% to 60%, in relation to the areas of the particular sides or the total area. The diameter or the maximum clear width of these gaps is in most cases 3 to 15 mm, preferably 6 to 12 mm. In accordance with the granule particles, the center in the packaging material particles can also, if appropriate, contain a gap in addition. In principle, the size of the gaps in the packaging material particles, as also in the granule particles, is not critical and can assume higher or lower values than the percentages indicated above, but certain disadvantages must then be accepted.

Depending on the degree of foaming etc., the surface of the packaging material particles contains a varying number of openings (craters) which have been formed by the blowing agent as it escapes.

The void volume of a non-vibrated heap of the packaging material according to the invention (determined by the method of measurement described later in the text) is generally over 60%, preferably 65 to 90% and especially 65 to 80%.

As a result of the distorted shape of the packaging material solid according to the invention, not only is a particularly high void volume formed in the heap, but, in addition, as a result of the sides of paraboloidal (U-shaped) curvature and as a result of the preferred gaps according to the invention, the particles have an elastic deformation behavior, without the occurrence of a permanent deformation or even a destruction of the foam structure.

The packaging material according to the invention can contain the usual amounts of the usual additives, such as flame-retardants, UV stabilizers, heat stabilizers, dyestuffs and finishing agents for external application.

The invention is illustrated in greater detail by means of the drawings.

FIGS. 1 and 2 represent, in considerable enlargement, a foamable, three-sided granule particle, while FIGS. 3 to 5 relate to the particles of the packaging material according to the invention which have been obtained therefrom by foaming.

FIGS. 6 to 10 relate to the appropriate particles containing gaps.

In FIG. 1, which shows an elevation of a granule particle (1) according to the invention, (2), (3) and (4) denote the three sides of the particle. (A) and (B) indicate the dimensions of the particle in two directions in space. $\alpha$ represents the angle between the two sides (2) and (4).

Figure 1:
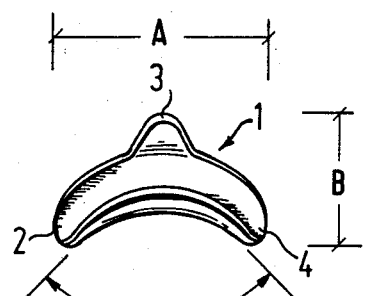
Figure 2:
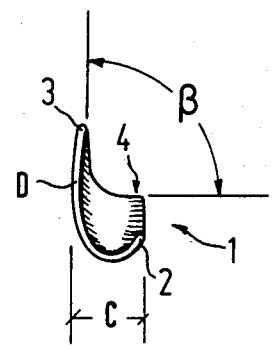
FIG. 2 shows the particle (1) of FIG. 1 in a side elevation. In this, (D) denotes the wall thickness, (C) denotes a further dimension of the particle and $\beta$ denotes the angle between the sides (3) and (2)/(4).
Figure 3:
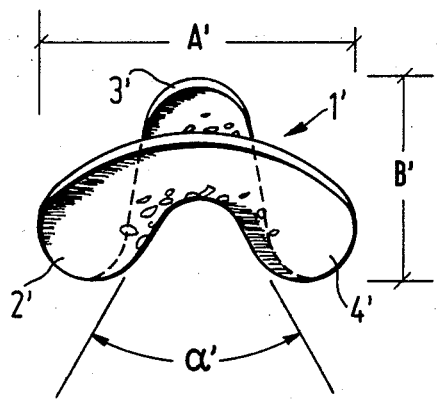
FIG. 3 represents a particle (1') of the packaging material according to the invention, which has been formed by foaming the granule particle (1) of FIG. 1. (2'), (3') and (4') again denote the three sides, while (A') and (8') express the dimensions of this particle in two directions in space. $\alpha'$ indicates the angle between the two sides (2') and (4').
Figure 4:
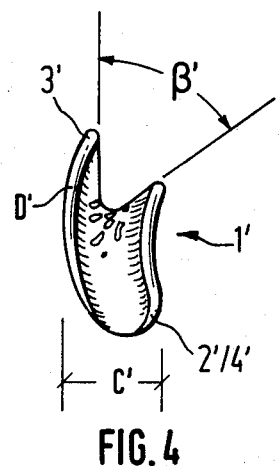
FIG. 4 shows the particle (1') of FIG. 3 in a side elevation. In this, (D') denotes the wall thickness, (C') denotes a further dimension of the particle (1'), and ($\beta'$) denotes the angle between the sides (3') and (2')/(4').
Figure 5:
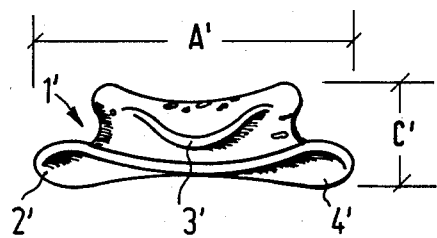
Figure 6:
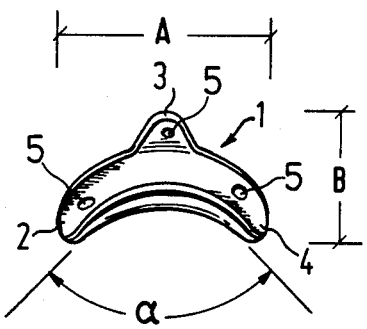
Figure 7:
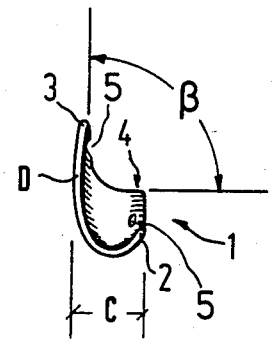
Figure 8:
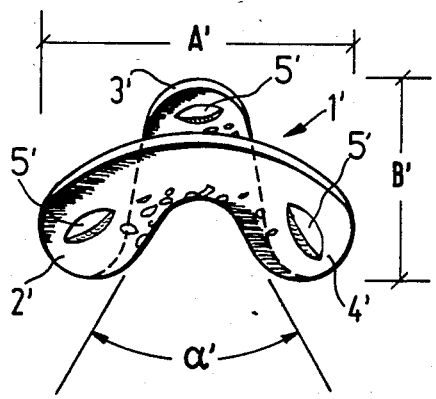
Figure 9:
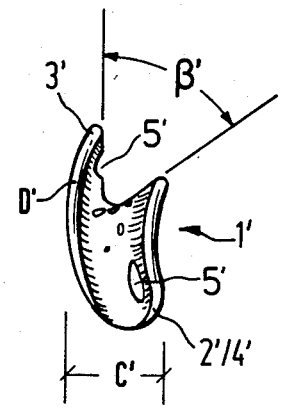
Figure 10:
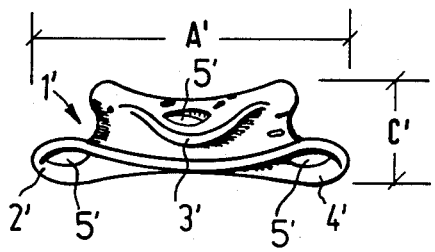

FIG. 5 results from FIG. 3 by tilting the particle (1') forwards by 90°.

In FIGS. 6 to 10, (5) and (5') denote the gaps.

EXAMPLES

The packaging behavior of foamed plastics particles is essentially determined by the bulk density, the void volume and the flow. Evidence of additional importance is provided by the falling cylinder test.

These values of the packaging material according to the invention, which determine the packaging behavior, are contrasted in Table 1 below with those of the packaging material according to German Offenlegungsschrift No. 2,848,338.

The tests were carried out as follows and are summarized in Table 1:

1. Determination of the Increase in the Bulk Density of the Heap Caused by Vibration A graduated beaker of capacity 10 liters and dimensions D=189 mm cross-section and H=357 mm was filled with particles of packaging agent under conditions of free fall by means of a test funnel. The test funnel was composed of sheet metal having a smooth surface, had a slide valve at its outlet and had the following dimensions:

| | |
|---|---|
| Large diameter | 850 mm ± 5 mm |
| Small diameter | 150 mm ± 5 mm |
| Angle of inclination | 45° ± 1° |
| Total height including outlet | 700 mm ± 5 mm |
| Height of outlet | 305 mm |
| Distance between slide valve and end of outlet | 25 mm ± 2 mm |
| Thickness of slide valve | 1.6 mm |

A test funnel of this type is described, for example, in "Technische Lieferbedingungen ("Technical Conditions of Supply") TL 8135-0032, Edition 2 (March 1982)", pages 1 to 6, issued by the Bundesamt für Wehrtechnik und Beschaffung ("Federal Office for Defense Technology and Procurement") of the Federal Republic of Germany.

The upper edge of the graduated beaker was then leveled off with a straight-edge. The net weight divided by 10 gave the bulk density of the non-vibrated heap in grams per liter.

2. Determination of the Bulk Density of the Vibrated Heap

The graduated beaker described under (1) was filled with particles of packaging material under conditions of free fall by means of the test funnel also described under (1). During the filling operation, the graduated beaker was continually joggled at short intervals on a massive support until no further contraction in the volume of the heap took place. The graduated beaker was then leveled off with a straight-edge. The net weight divided by 10 gave the bulk density of the vibrated heap in grams per liter.

3. Determination of the Compaction of the Heap Caused by Vibration (Vibration Compaction)

The compaction of the heap caused by vibration was given by the ratio: (bulk density of vibrated heap−bulk density of non-vibrated heap)×100/bulk density of non-vibrated heap, and in the present cases was:

$$\frac{[6.4 \ (6.0) \ g/l - 5.6 \ (5.4) \ g/l] \times 100}{5.6 \ (5.4) \ g/l} = 14.28 \ (11.11)\%$$

4. Determination of the Void Volume of the Non-Vibrated Heap

The above graduated beaker was filled with particles of packaging material as described under (1). After the upper edge of the graduated beaker had been leveled off with a straight-edge, the graduated beaker was closed by means of a wire mesh screen. The graduated beaker was then dipped under water and rotated in all directions so that all the cavities in the heap were filled with water. The volume of water required to fill the cavities corresponded to the void volume of the non-vibrated heap.

5. Determination of the Void Volume of the Vibrated Heap

The said graduated beaker was filled as described under (2) and vibrated until the most compact packing of the particles was achieved. The graduated beaker was then dipped under water and rotated in all directions so that all the cavities were filled with water. The volume of water required to fill the cavities corresponded to the void volume of the vibrated heap.

6. Determination of the Flow Time (Flow Behavior)

This test was carried out five times. In the test, the foamed particles were subjected to standard climate 23/50-2 DIN 50,014 until they reached constant weight. The outlet of the funnel described under (1) was closed by means of the slide valve and filled up to the edge with the material to be tested. The slide valve was then withdrawn and the time taken for complete outflow was measured.

7. Determination of Penetration Depth in the Falling Cylinder Test

The test layout used for this purpose is described in the HOECHST AG Brochure " ®Hostastar" (September 1981 edition).

A steel cylinder weighing 1.65 kg (diameter 44 mm, length 140 mm) was dropped from a height of 1 m into a container which had been filled with particles of packaging material and vibrated briefly (upper diameter: 420 mm; lower diameter: 360 mm; height of fill: 370 mm).

The cylinder, which landed with its longitudinal axis horizontal, only produced a brief deformation of the heap of packaging agent particles and then rebounded in a damped manner from the level of the height of fill. Only on its second impact on the heap did the steel cylinder penetrate slightly into the heap, but it remained fixed in this position (Table 1, Packaging Material I) or did not penetrate into the heap at all and remained fixed on the surface (Packaging Material II). The distance from the level of the height of fill to the penetration of the lower metal line of the steel cylinder is quoted, in cm, as the depth of penetration.

8. Spring-back of the Cylinder from the Surface of the Heap

The packing and fixing properties of heaped packaging agents can be efficiently differentiated by means of this criterion of assessment. If no springing back takes place on the first impact of the steel cylinder on the heap, the depth of penetration is always greater than with heaped packaging materials which force the steel cylinder to spring back because of their good jamming and cushioning properties and which only permit very low depths of penetration onto the heap at the second or third impact resulting from the spring-back action.

TABLE 1

| | Dimension | I | II | A |
|---|---|---|---|---|
| 1 Bulk density of non-vibrated heap | g/l | 5.6 | 5.4 | 7.2 |
| 2 Bulk density of the vibrated heap | g/l | 6.4 | 6.0 | 8.0 |
| 3 Increase in the bulk density of the heap caused by vibration | % | 14.3 | 11.11 | 11.1 |
| 4 Void volume in the non-vibrated heap | % | 67 | 69 | 49 |
| 5 Void volume in the vibrated heap | % | 64.5 | 66 | 44.8 |
| 6 Flow time | seconds | 14 | 15 | 12 |
| 7 Depth of penetration in falling cylinder test | cm | 3 | 0 | 4 |
| 8 Spring-back of the cylinder from the surface of the heap | yes/no | yes | yes | yes |

I = Packaging material according to the invention (three-sided, without gaps; A' = 20 to 38 mm; B' = 17 to 30 mm; C' = 12 to 18 mm; $\alpha'$ is approx. 60 to 100° and $\beta'$ is approx. 30 to 200°)
II = Packaging material according to the invention (as in I, but having oval to lenticular gaps on all three sides; clear width of these gaps approx. 30% to 60% of the area of the particular side).
A = Packaging material according to German Offenlegungsschrift 2,848,338 (U.S. Pat. No. 4,269,895).

It can be seen from Table 1 that the packaging material particles I/II according to the invention are superior to the particles A in bulk density, void volume, falling cylinder test and depth of penetration. The flow time is still far below the maximum value of 40 seconds given in the "Technische Lieferbedingungen" ("Technical Conditions of Supply") quoted above and corresponds approximately to the value of the comparison particles.

We claim:

1. Plastics granules composed of foamable particles in star shape, wherein the plastics granules are composed predominantly of of particles derived from a star-shaped fundamental solid having three, five or more sides, in the case of three sides the surfaces of two sides being curved relative to one another in a paraboloidal manner, while the surface of the third side has a paraboloidal curvature which is opposed thereto, and, in the case of five or more sides, four sides are each curved relative to one another in a paraboloidal manner, while the surface or surfaces of the remaining side or sides have a paraboloidal curvature which is opposed to the curvature of the four sides, whereby, in each of these cases, a three-dimensionally domed structure is formed and has paraboloidal surfaces of curvature which are staggered in relation to one another.

2. Plastics granules composed of foamable particles in star shape, wherein the plastics granules are predominantly composed of particles derived from a star-shaped fundamental solid having four sides, all four sides being curved relative to one another in a paraboloidal manner, as a result of which a three-dimensionally domed structure is formed and has paraboloidal surfaces of curvature which are staggered in relation to one another.

3. Plastics granules as claimed in claim 1, wherein the foamable particles contain at least one gap.

4. Plastics granules as claimed in claim 1, wherein at least one of the sides or the center of the particles contains a gap.

5. Plastics granules as claimed in claim 3, wherein the gap has a round to oval shape.

6. Plastics granules according to claim 3, wherein the area of the gap is 25% to 75% of the area of the particular side.

7. Plastics granules as claimed in claim 1, wherein the particles are three-sided.

8. Plastics granules as claimed in claim 1, wherein the wall thickness of the particles is 1.0 to 2.5 mm.

9. Plastics granules as claimed in claim 7 wherein one of the sides is 8 to 10 mm, another side is 5 to 7 mm and the third side is 4 to 5 mm.

10. Plastics granules as claimed in claim 2, wherein the foamable particles contain at least one gap.

11. Plastics granules as claimed in claim 2, wherein at least one of the sides or the center of the particles contains a gap.

12. Plastics granules as claimed in claim 10, wherein the gap has a round to oval shape.

13. Plastics granules according to claim 10, wherein the area of the gap is 25% to 75% of the area of the particular side.

14. Packaging material composed of foamed plastics particles which are domed and are obtained by foaming the plastics granules as claimed in claim 1.

15. Packaging material as claimed in claim 14, wherein the particles contain at least one gap.

16. Packaging material as claimed in claim 14, wherein at least one of the sides or the center of the particles contains a gap.

17. Packaging material as claimed in claim 14, wherein the wall thickness of the particles is 3 to 6 mm.

18. Packaging material as claimed in claim 14, wherein the particles are three-sided and one side is 20 to 38 mm, another side is 17 to 30 mm and the third side is 12 to 18 mm.

19. Packaging material as claimed in claim 14, wherein, when poured in to form a heap of loose material, the void volume of the non-vibrated heap is at least 60%.

20. Packaging material as claimed in claim 14, wherein the particles are composed of polystyrene and have been foamed by means of a blowing agent which is customary per se.

21. Packaging material composed of foamed plastics particles which are domed and are obtained by foaming the plastics granules as claimed in claim 2.

22. Packaging material as claimed in claim 21, wherein the particles contain at least one gap.

23. Packaging material as claimed in claim 21, wherein at least one of the sides or the center of the particles contains a gap.

24. Packaging material as claimed in claim 21, wherein the wall thickness of the particles is 3 to 6 mm.

25. Packaging material as claimed in claim 21, wherein, when poured in to form a heap of loose material, the void volume of the non-vibrated heap is at least 60%.

26. Plastics granules as claimed in claim 3, wherein the gap has a lenticular shape.

27. Plastics granules as claimed in claim 10, wherein the gap has a lenticular shape.

* * * * *